(12) United States Patent
Shin et al.

(10) Patent No.: US 8,723,122 B2
(45) Date of Patent: May 13, 2014

(54) INFRARED SENSOR MODULE, TOUCH SENSING METHOD THEREOF, AND AUTO CALIBRATION METHOD APPLIED TO THE SAME

(75) Inventors: Jae-Hun Shin, Goyang-si (KR); Hyung-Uk Jang, Goyang-si (KR); Jun-Seok Oh, Pohang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/287,785

(22) Filed: Nov. 2, 2011

(65) Prior Publication Data

US 2012/0105829 A1     May 3, 2012

(30) Foreign Application Priority Data

Nov. 2, 2010   (KR) .................. 10-2010-0108338
Oct. 20, 2011   (KR) .................. 10-2011-0107591

(51) Int. Cl.
*G01J 3/00*     (2006.01)
*G06K 7/10*     (2006.01)
*G02B 19/00*    (2006.01)
*G01J 5/10*     (2006.01)

(52) U.S. Cl.
CPC .......... *G06K 7/10732* (2013.01); *G02B 19/009* (2013.01); *G01J 3/00* (2013.01); *G01J 5/10* (2013.01)
USPC ........................................ 250/338.1

(58) Field of Classification Search
CPC ...... G06K 7/10732; G02B 19/009; G01J 3/00

USPC ........................................ 250/338.1
See application file for complete search history.

(56) References Cited

U.S. PATENT DOCUMENTS 6,972,401 B2 *  12/2005  Akitt et al. .................. 250/221
7,202,856 B2 *   4/2007  Cok ............................ 345/173

(Continued)

FOREIGN PATENT DOCUMENTS

CN          101582001 A       11/2009

OTHER PUBLICATIONS

Extended European Search Report issued in corresponding European Patent Application No. 11008611.3, mailed May 8, 2013.
Office Action and Search Report issued in corresponding Chinese Patent Application No. 201110345978.8, mailed Jan. 8, 2014, 14 pages.

*Primary Examiner* — Marcus Taningco
(74) *Attorney, Agent, or Firm* — Brinks Gilson & Lione

(57) ABSTRACT

An infrared sensor module, a touch sensing method thereof, and an auto calibration method applied to the same are disclosed, the touch sensing method includes turning on the infrared sensor module which includes a sensor block with a light receiving region and is arranged to be perpendicular to a surface of a display panel, the light receiving region being divided into m×n blocks (where, each of m and n is a natural number of two or more) arranged in m rows by n columns, each of the blocks having a plurality of light receiving pixels arranged in a row direction, scanning optical signals of each block, selecting the block having maximum output optical signals with respect to the blocks of each column, and summing the optical signals of the light receiving pixels of the block selected from the column.

19 Claims, 13 Drawing Sheets

(56) References Cited

U.S. PATENT DOCUMENTS

| | | |
|---|---|---|
| 7,232,986 B2* | 6/2007 | Worthington et al. ........ 250/221 |
| 7,355,594 B2* | 4/2008 | Barkan ......................... 345/173 |
| 2005/0077452 A1 | 4/2005 | Morrison et al. |
| 2006/0114245 A1* | 6/2006 | Masters et al. ................ 345/175 |
| 2006/0232792 A1 | 10/2006 | Kobayashi |
| 2009/0128508 A1* | 5/2009 | Sohn et al. .................... 345/173 |
| 2010/0045629 A1 | 2/2010 | Newton |
| 2012/0146947 A1* | 6/2012 | Massetti ....................... 345/175 |

* cited by examiner

Left-right deviation

Left-right central line

INFRARED SENSOR MODULE, TOUCH SENSING METHOD THEREOF, AND AUTO CALIBRATION METHOD APPLIED TO THE SAME

This application claims the priority and the benefit under 35 U.S.C. §119(a) on Patent Application No. 10-2010-0108338 filed in Republic of Korea on Nov. 2, 2010 and Patent Application No. 10-2011-0107591 filed in Republic of Korea on Oct. 20, 2011 the entire contents of which are hereby incorporated by reference.

BACKGROUND

1. Field of the Invention

The present disclosure relates to an optical sensing frame, and more particularly, to an infrared sensor module capable of covering an optical signal region by change of a light receiving region, preventing noise through processing of blocks in the light receiving region which extends, and adjusting the light receiving region without physical adjustment thereof, to a touch sensing method of the infrared sensor module, and to an auto calibration method applied to the same.

2. Discussion of the Related Art

In general, a touch screen is one of various interface types between a user and an information and communication device, which uses various kinds of displays. Such a touch screen is an input device which enables the user to interface with the device as the user touches a screen with a hand or a pen.

The touch screen allows for a conversational and intuitive manipulation of the device, since it may be easily used by anyone by a touch of a button displayed on the display with a finger. Because of these features, the touch screen is applied in many fields, such as issuing machines in banks and public agencies, various medical devices, tour and major facility guidance devices, and traffic guidance devices, in addition to monitors and televisions which are personally used.

Various types of touch screens are available, such as a resistive type touch screen, a capacitive type touch screen, an ultrasonic wave type touch screen, an infrared type touch screen, and so on depending on ways of perception used.

Although the above types have different advantageous, the infrared type touch screen is recently drawing attention due to a minimized pressure required to be applied to a touch surface, and convenience of arrangement.

Hereinafter, a conventional optical type touch screen will be described with reference to the attached drawings.

FIG. 1 is a top view illustrating a display module and infrared sensor modules arranged at outer corners thereof, in the conventional optical type touch screen.

As shown in FIG. 1, the conventional optical type touch screen is constructed in such a manner that the infrared sensor modules 2a and 2b are arranged at the outer corners of the display module 1. Although not shown, retro-reflection plates (not shown) are located at all three sides of the display module 1 except for a horizontal line which connects the infrared sensor modules 2a and 2b.

The infrared sensor modules 2a and 2b are coupled with a separate assembly (not shown) from the display module 1, and reinforced glass are arranged at a lower portion of the infrared sensor modules 2a and 2b to be located on the display module 1. The reinforced glass functions as a touch input surface which enables a direct touch of a user.

Here, each of the infrared sensor modules 2a and 2b is located at the outer corner of the display module 1, and has a light receiving portion for sensing light which is incident in a horizontal direction at each position thereof.

During detection of the touch, each of the infrared sensor modules 2a and 2b receives light which is incident from a coordinate input area at each position thereof so as to enable a coordinate of an object in the coordinate input area to be recognized through measurement of light quantity distribution. It is important that the light receiving portion is fixedly located on a surface of the reinforced glass which functions as the touch input surface. Because an optical signal is not fully received to the light receiving portion when each infrared sensor module deviates in position. In this case, since recognition of the object is difficult in the coordinate input area, the touch may not be perceived or erroneous perception of the touch may occur.

However, the conventional optical type touch screen as described above has the following problems.

In general, each of the infrared sensor modules includes the light receiving portion in the form of a line sensor having a plurality of pixels in line. In this case, when the infrared sensor module originally deviates in position during assembly of the infrared sensor module or a position of the infrared sensor module deviates due to elapse of time or impact of products, the received optical signal may actually depart from the light receiving portion of the infrared sensor module. Therefore, touch sensitivity is deteriorated, or a touch position is normally not perceived.

In order to prevent this problem, it is considered to enlarge a size of the light receiving portion in upward and downward directions and in left and right directions allowing for deviation in the position of the infrared sensor module. However, this has a problem in that the touch screen increases in thickness and in outer area by increase in volume of the infrared sensor module. In addition, there is a problem in that the light receiving portion is widely arranged at a larger space than actually the required space, thereby processing an increased amount of transmission.

BRIEF SUMMARY

An infrared sensor module includes a sensor block with a light receiving region, wherein the sensor block is arranged to be perpendicular to a surface of a display panel, the light receiving region is divided into 'm×n' blocks (where, each of 'm' and 'n' is a natural number of two or more) arranged in 'm' rows by 'n' columns, and each of the blocks includes a plurality of light receiving pixels arranged in the same row, and optical signals of a particular block, to which light is received, are transmitted to a touch control unit.

In another aspect of the present invention, a touch sensing method of an infrared sensor module includes turning on the infrared sensor module which includes a sensor block with a light receiving region and is arranged to be perpendicular to a surface of a display panel, the light receiving region being divided into 'm×n' blocks (where, each of 'm' and 'n' is a natural number of two or more) arranged in 'm' rows by 'n' columns, each of the blocks having a plurality of light receiving pixels arranged in a row direction, scanning optical signals of each block, selecting the block having maximum output optical signals with respect to the blocks of each column, and summing the optical signals of the light receiving pixels of the block selected from the column.

In a further aspect of the present invention, an auto calibration method of an infrared sensor module includes turning on the infrared sensor module which includes a sensor block with a light receiving region and is arranged to be perpendicular to a surface of a display panel, the light receiving region being divided into 'm×n' blocks (where, each of m and n is a natural number of two or more) arranged in 'm' rows by 'n' columns, each of the blocks having a plurality of light receiving pixels arranged in a row direction, scanning optical signals per each of the 'm' rows, comparing the optical signals of each row, selecting the block having maximum output optical signals with respect to the blocks of each n column, and activating the block which is selected and deactivating the block which is not selected so as to assort the blocks.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an infrared sensor module, a touch sensing method, and an auto calibration method thereof according to an embodiment of the present invention will be described in detail with reference to the attached drawings.

Firstly, light receiving characteristics of an optical signal when the infrared sensor module deviates in position will be described.

Figure 1:
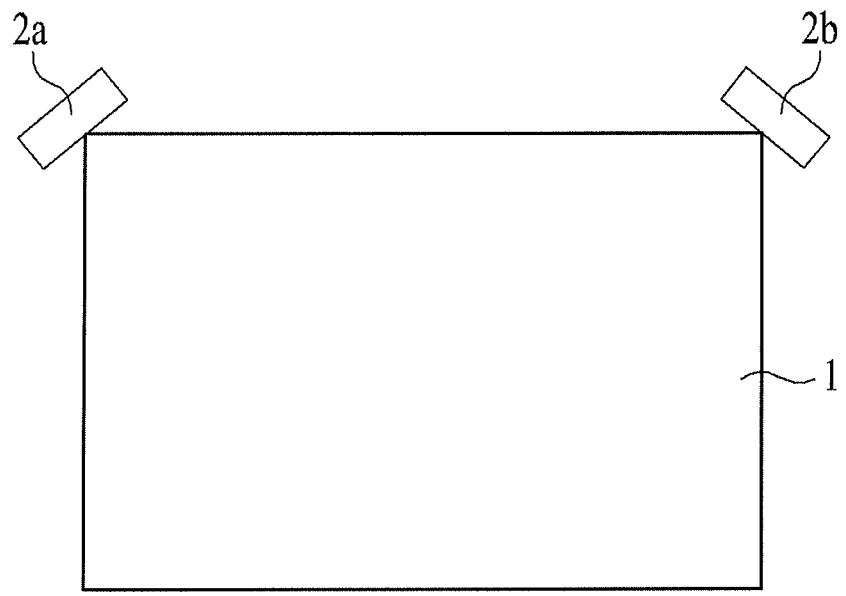
FIG. 1 is a top view illustrating a display module and infrared sensor modules arranged at outer corners thereof, in a conventional optical type touch screen.
Figure 2:
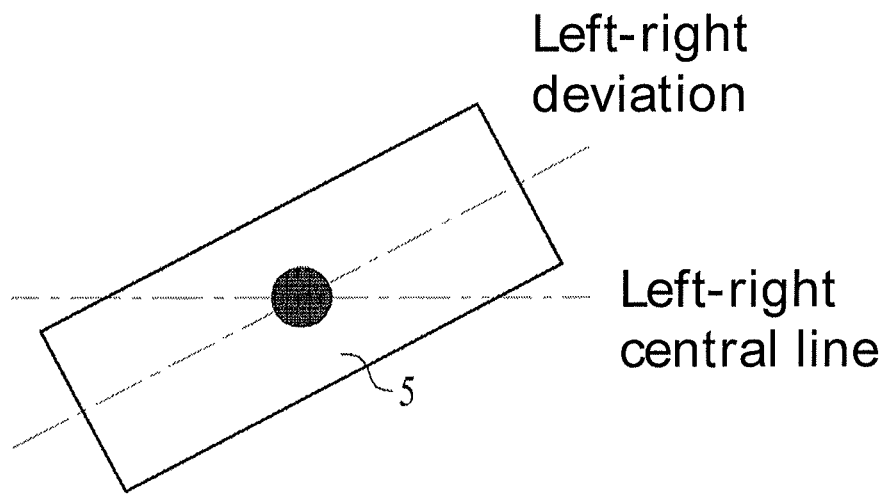
FIG. 2 is a top view illustrating left-right deviation of an infrared sensor module.
Figure 3:
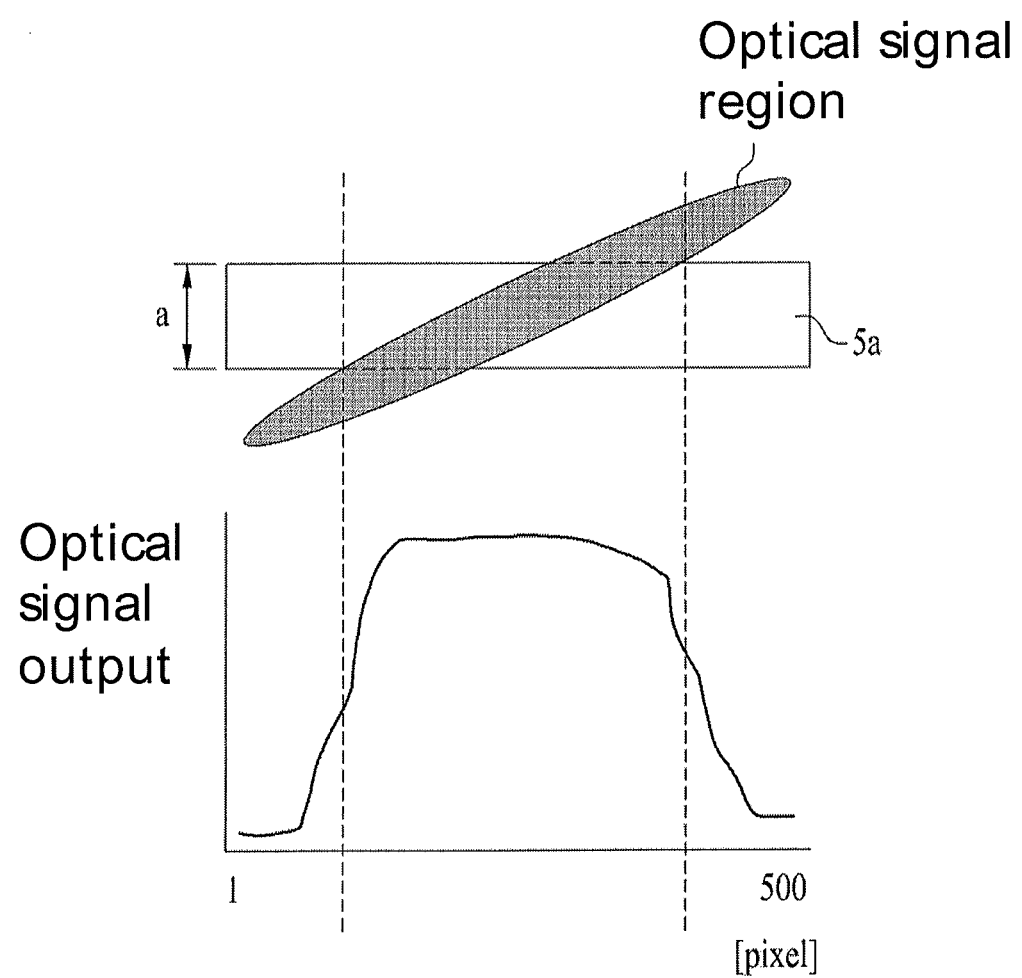
FIG. 3 is a graph illustrating an optical signal region with respect to a light receiving region in FIG. 2, and an optical signal waveform in the light receiving region in the case of the left-right deviation.

FIG. 2 is a top view illustrating left-right deviation of the infrared sensor module. FIG. 3 is a graph illustrating an optical signal region with respect to a light receiving region in FIG. 2, and optical signal waveform in the light receiving region in the case of the left-right deviation.

FIG. 2 shows that the infrared sensor module 5 deviates in left and right directions from a left-right central line. In this case, when the infrared sensor module 5 includes the light receiving region 5a having light receiving pixels arranged in line along a transverse direction, left and right portions of the optical signal region, which actually receives optical signals, partially departs from the light receiving region 5a, as shown in FIG. 3.

The light receiving region 5a is, at a vertical length "a" thereof, the same as the vertical length of any one of the light receiving pixels.

When the light receiving region 5a is a line sensor having a plurality of light receiving pixels, for example, five hundreds of light receiving pixels in the transverse directions, it is observed that output of the optical signal is remarkably low at left and right portions of the light receiving region 5a, as shown in FIG. 3. This results from departure of the optical signal region, which actually receives the optical signals, from the light receiving region 5a. In this case, touch coordinates, which correspond to the left and right portions of the light receiving region 5a, are not detected, and thus erroneous detection of a touch may occur due to the left-right deviation of the infrared sensor module 5.

Figure 4:
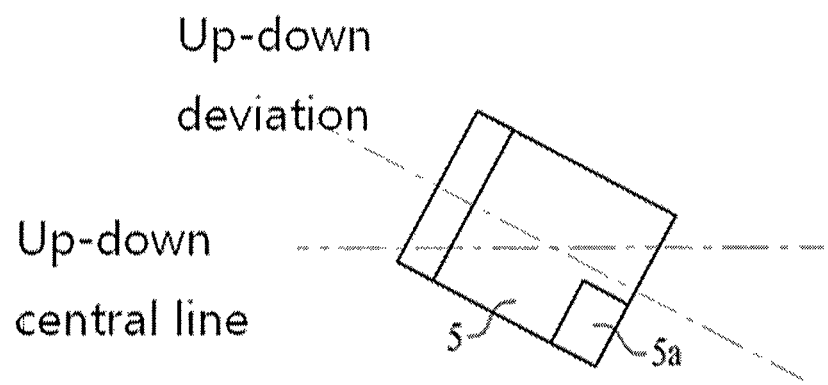
FIG. 4 is a top view illustrating up-down deviation of the infrared sensor module.
Figure 5:
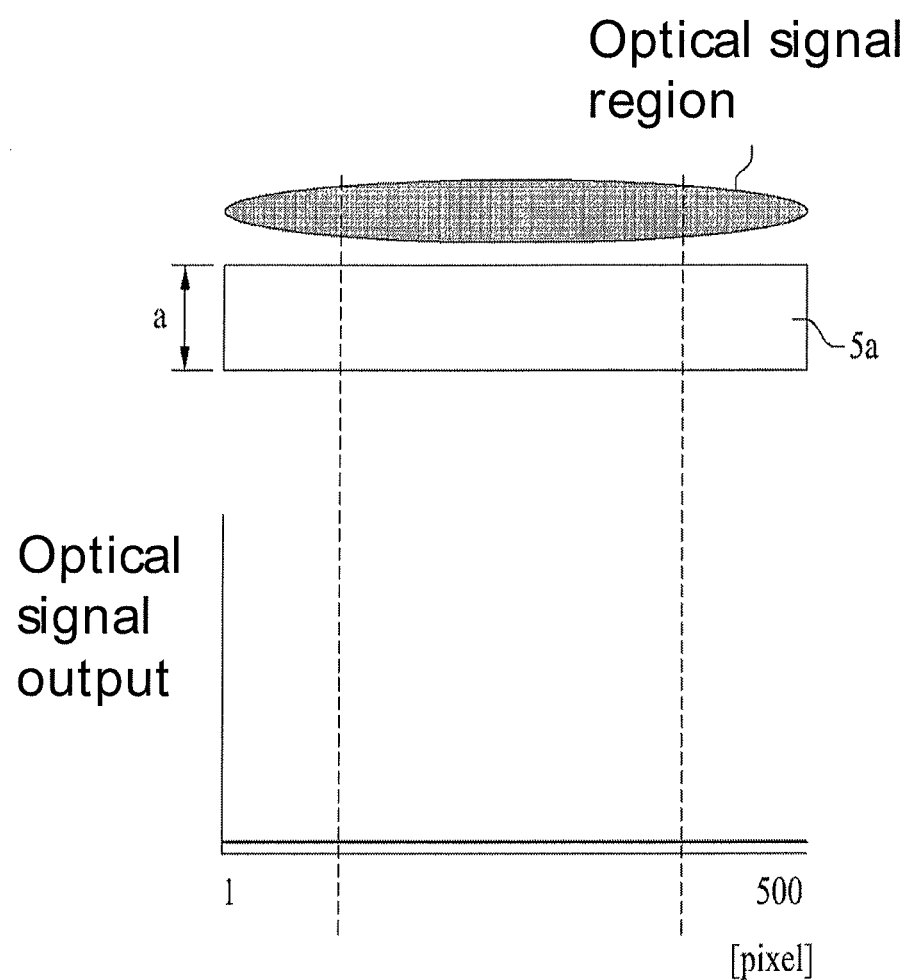
FIG. 5 is a graph illustrating an optical signal region with respect to the light receiving region in FIG. 4, and an optical signal waveform in the light receiving region in the case of the up-down deviation.

FIG. 4 is a top view illustrating up-down deviation of the infrared sensor module. FIG. 5 is a graph illustrating an optical signal region with respect to the light receiving region in FIG. 4, and an optical signal waveform in the light receiving region in the case of the up-down deviation.

As shown in FIG. 4, when the infrared sensor module 5 deviates upwards or downwards from a up-down central line, the optical signal region, which actually receives the optical signals, may depart from the light receiving region 5a which has the light receiving pixels arranged in line along the transverse direction in the infrared sensor module 5, as shown in FIG. 5.

In this case, since the optical signals are not incident on the light receiving region, the waveform which is output from the infrared sensor module is very small and a value thereof is also not effective. Therefore, the touch may not be actually detected.

Figure 6:
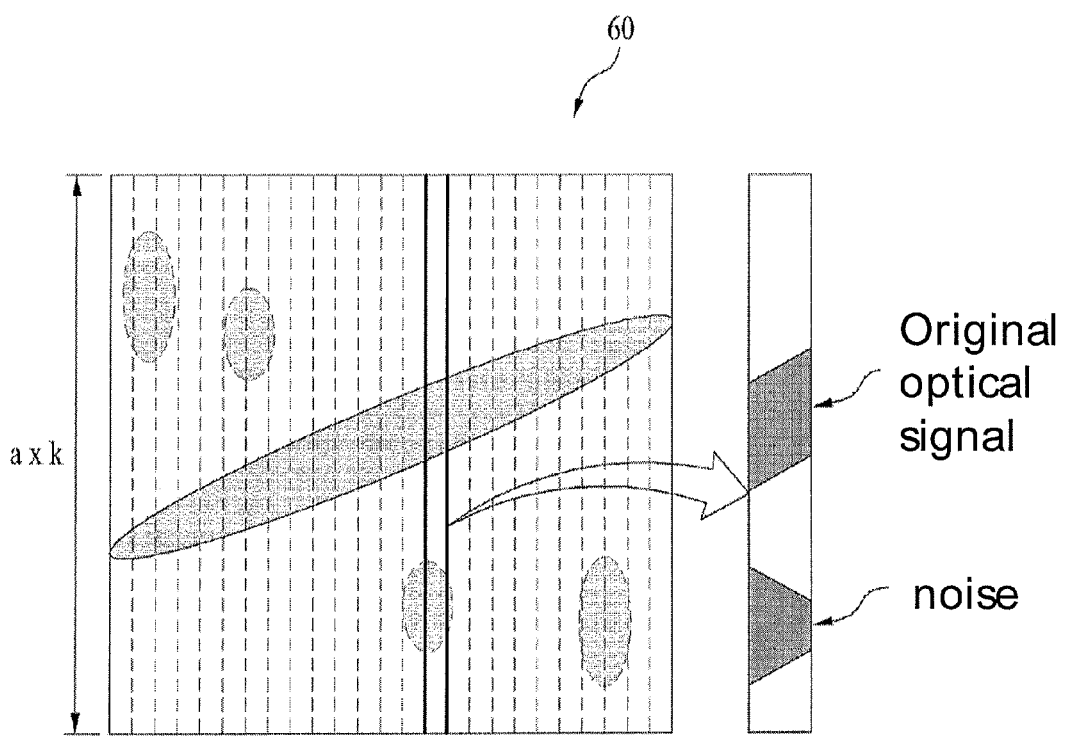
FIG. 6 is a view illustrating a light receiving region of one type of infrared sensor module in order to solve a problem in FIG. 4.
Figure 7:
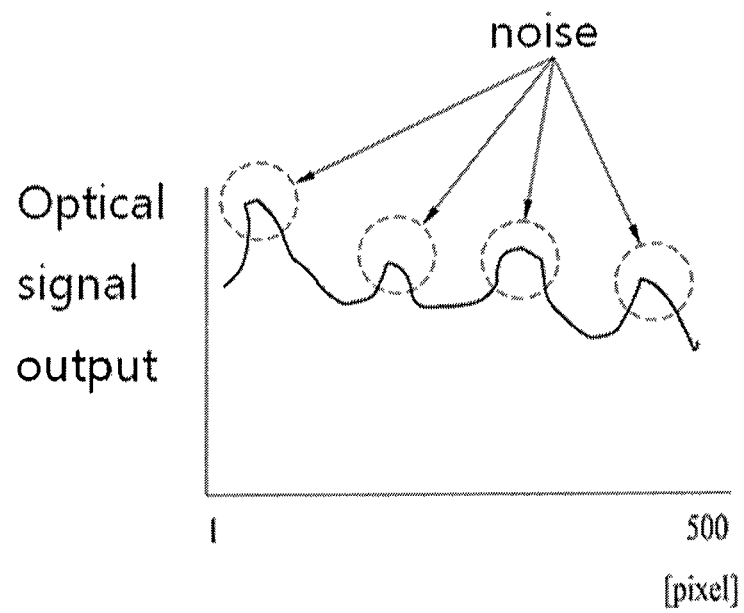
FIG. 7 is a graph illustrating optical signal output after sensing an optical signal in FIG. 6.

FIG. 6 is a view illustrating a light receiving region of one type of infrared sensor module in order to solve a problem in FIG. 4. FIG. 7 is a graph illustrating optical signal output after sensing an optical signal in FIG. 6.

In order to solve the problems due to the deviation of the infrared sensor module as described above, a way of largely enlarging a vertical length of the light receiving region may be used, as shown in FIG. 6. The illustrated drawing shows that the vertical length of the infrared sensor module 60 is formed as k times longer (where, k is a natural number of two or more) than the infrared sensor module 5 of FIG. 4. Accordingly, although the infrared sensor module 60 deviates in position, the optical signals are sufficiently received within the light receiving region by an extended vertical length of the light receiving region.

Here, pixels are respectively distributed in a plurality of columns in the light receiving region, and a light quantity is sensed from each of the pixels. In the case of the light quantity received from any one of the pixels, noise is also sensed and received in addition to the optical signal which is originally incident, as shown in FIG. 7.

Accordingly, when the light receiving region is enlarged in a longitudinal direction like the above-mentioned light receiving region shown in FIG. 6, the deviation in upward and downward or left and right directions may be complemented. However, since the waveform including a noise component is detected together with the optical signal, detection performance of the touch may be deteriorated.

Thus, an infrared sensor module according to the present invention is designed in such a manner that a light receiving region is more enlarged in size allowing for a up-down or left-right deviation so as to include an entire optical signal region within the light receiving region, and a data transmission amount is simultaneously reduced through a way of summing pixel data signals in column directions to output one signal with respect to the pixels in each column and processing of blocks.

Figure 8:
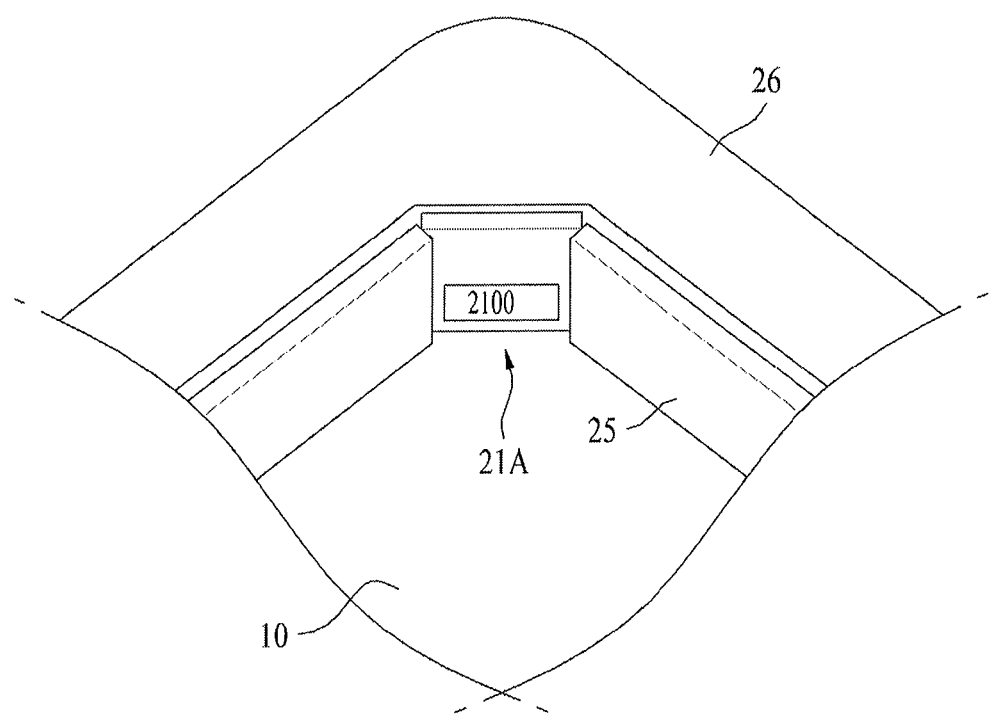
FIG. 8 is a perspective view illustrating any one of corners of a display device in which infrared sensor modules according to an embodiment of the present invention are placed.

FIG. 8 is a perspective view illustrating any one of corners of a display device in which infrared sensor modules according to an embodiment of the present invention are placed.

As shown in FIG. 8, each of the infrared sensor modules 21A includes a sensor block 2100 for receiving infrared light therein and transmitting output of an optical signal to a touch control unit (not shown). Also, the infrared sensor module 21A may further include an infrared light emitting portion (not shown). The infrared light emitting portion may also be formed to be separated from the infrared sensor module 21A, as necessary.

In each of the infrared sensor modules 21A, the sensor block 2100 is arranged to be perpendicular to a display panel 10, and an arrangement area of the sensor block 2100 corresponds to the corner of the display panel 10.

Meanwhile, retro-reflection plates 25 is further formed at edges of the display panel 10 except for the infrared sensor modules 21A, respectively, so that light which is incident on the retro-reflection plates 25 from the infrared light emitting portion is reflected, and is then converged on the infrared sensor modules 21A. In this case, each of the retro-reflection plates 25 is located at a lower side of an upper surface of a case top 26 so that the infrared light is horizontally transmitted between the infrared light emitting portion and the sensor block 2100. If necessary, frame structures (not shown) made of a plastic component may further be placed between each of the retro-reflection plates 25 and a corresponding inside surface of the case top 26, respectively. In this case, the retro-reflection plate 25 is located to be attached to a side portion of each frame structure.

Here, the infrared sensor modules 21A formed at the corners of the display panel 10, the retro-reflection plates 25 formed at the edges of the display panel 10, the frame structures (not shown) to which the retro-reflection plates 25 are attached, and the case top 26 are collectively called an optical sensing frame.

Furthermore, the infrared light emitting portion and the sensor block 2100 of each infrared sensor module 21A may further include a lens (not shown) and an infrared filter (not shown) so as to be suitable for emitting and receiving the infrared light, respectively.

Also, infrared light data received from the sensor block 2100 of each infrared sensor module 21A is supplied to a control board (see reference numeral "30" in FIG. 15) so as to be used for arithmetic operation of touch detection.

The sensor block 2100 includes a light receiving region therein. The light receiving region has a two-dimensional array constructed in such a manner that a plurality of blocks which is one-dimensionally placed is arranged in a plurality of rows. Each of the blocks includes a plurality of pixels arranged in a row direction. Here, each of the pixels serves as a kind of light receiving element, and is formed of a rectangular shape having a different proportion in horizontal and vertical directions. In addition, the pixel allows an optical signal to be converted into an electric signal and be output.

Figure 9:
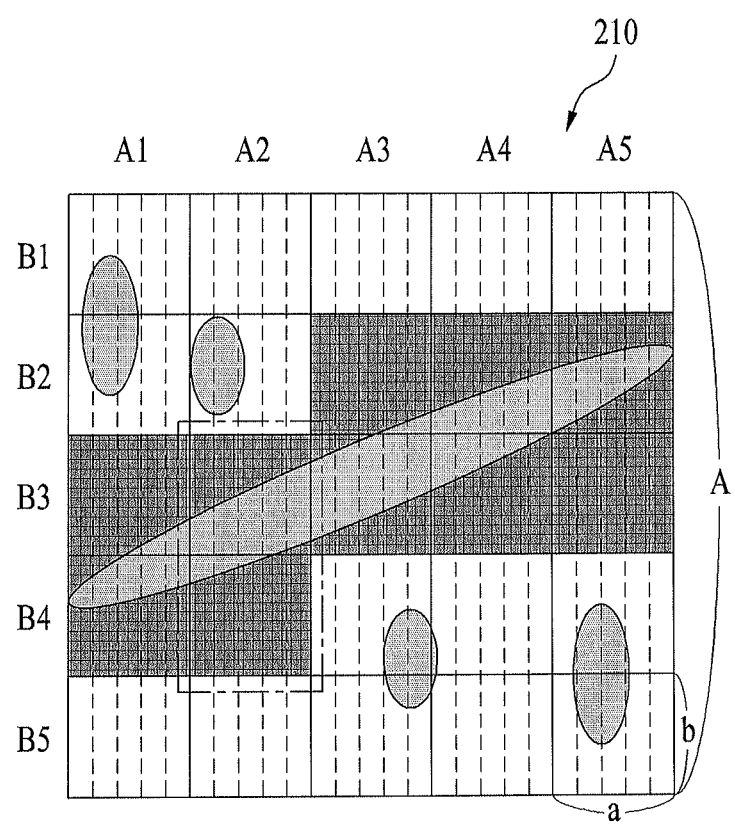
FIG. 9 is a view illustrating a light receiving region of the infrared sensor module according to the embodiment of the present invention.

AS described above, when each of the pixels has an elongated shape which extends in a column direction and is one-dimensionally arranged in one row, the optical signal sensed from each of the pixels is output. However, when each of the blocks includes a plurality of pixels in a two-dimensional block array as shown in FIG. 9, all the optical signals of the pixels, which is vertically arranged, may be summed on a per column basis so that one signal is output with respect to the pixels in the corresponding column, only optical signals of the pixels in a particular block(s) among the pixels arranged in the same column may be summed so that one signal is output with respect to the corresponding column, or only a particular one signal of the pixels arranged in the column may be output with respect to the corresponding column. A sensing method described below determines optical signal output corresponding to each column by the above-mentioned second and third ways.

Hereinafter, the light receiving region of each infrared sensor module and detection of the optical signals thereof according to the embodiment of the present invention will be described.

FIG. 9 is a view illustrating the light receiving region of the infrared sensor module according to the embodiment of the present invention.

The sensor block of the infrared sensor module according to the embodiment of the present invention will be described with reference to FIG. 9. The sensor block serves as an image sensor, and includes the light receiving region 210 composed of m×n blocks (where, m and n are natural numbers of two or more) therein.

The light receiving region 210 is divided into the m×n blocks (where, m and n are natural numbers of two or more) arranged in m rows by n columns. For example, when the infrared sensor module deviates from a left-right or up-down central line, each of the optical signals is received to the light receiving region 210 in a slant state.

Here, a vertical length "A" of the light receiving region 210 is smaller than a height of the sensor block 2100 shown in FIG. 8.

Each of m and n denotes the natural number of two to ten. That is, the light receiving region in the sensor block of the infrared sensor module according to the embodiment is arranged with the blocks composed of two to ten rows and two to ten columns, and is enlarged to have a plurality of light receiving pixels within each of the blocks. Consequently, although the infrared sensor module deviates in position, all the optical signals may be received to the light receiving region 210. In this case, the light receiving region in the sensor block of the infrared sensor module according to the embodiment is divided into a plurality of blocks. Thus, only the particular block(s) on which the optical signals are concentrated is activated so that the signals in the activated block are summed and output with respect to each column.

Hatched blocks in the light receiving region are a region actually used to sense the optical signals. Such a region is set as a Region of Interest (ROI).

Here, each of the blocks includes the plural pixels formed in line along the transverse direction. In addition, the block having a plurality of columns in the same row includes about 10~500 light receiving pixels. In this case, each of the light receiving pixels has the rectangular shape in which a vertical length thereof is relatively longer than a horizontal length thereof. The block is set to have a width dimension "a" and a length dimension "b". A vertical length of each block is the same as that of one light receiving pixel. As shown in FIG. 9, in accordance with the present embodiment, one block includes five light receiving pixels, and the light receiving region is arranged with five by five blocks.

However, the number of blocks or pixels in the block in the present invention is not limited to the illustrated example, the numbers of rows and columns in the blocks and of light receiving pixels provided in one row may also be modified, if necessary.

For example, the optical signal output of each pixel with respect to the light receiving region at which the optical signals are sensed in FIG. 9 is as follows.

Figure 10:
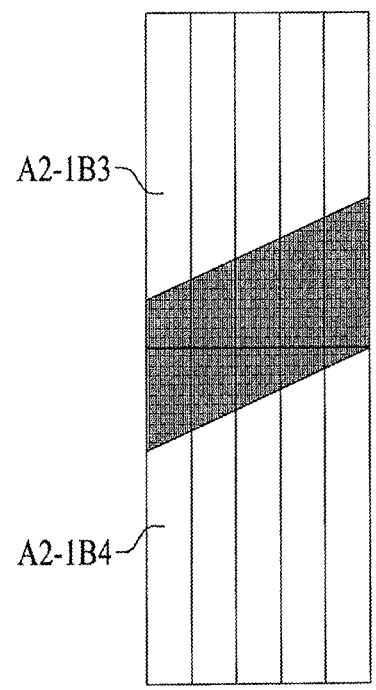
FIG. 10 is a view illustrating blocks selected from a column A2 of FIG. 9.
Figure 11:
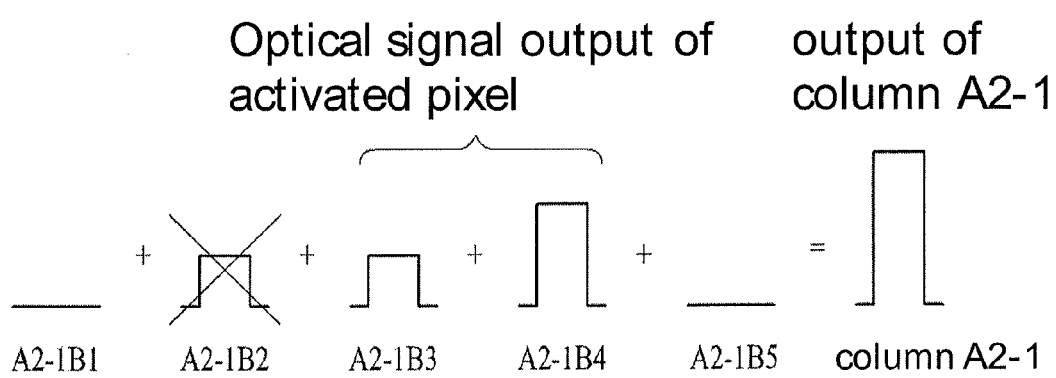
FIG. 11 is a view illustrating optical signal output of each pixel and the sum thereof in activated blocks of the column A2.

FIG. 10 is a view illustrating the blocks selected from the column A2 of FIG. 9. FIG. 11 is a view illustrating the optical signal output of each pixel and the sum thereof in the activated blocks of the column A2.

As shown in FIG. 10, with regard to the blocks of the column A2, the five blocks of B1~B5 is placed in the longitudinal direction, but the blocks activated by concentration of light quantities are the blocks A2-B3 and A2-B4. Primarily, the light quantities may be partially sensed in the block A2-B2. However, this is not the signal which is originally sensed and received to the infrared sensor module, but is actually noise. This noise may be excluded by activation of the particular block described above.

As shown in FIG. 11, the light quantities sensed with respect to the blocks of the column A2 are summed in the pixels of each column, and the blocks A2-B1, A2-B2, and A2-B5 except for the activated blocks A2-B3 and A2-B4 are deactivated blocks. These deactivated blocks are excluded from the sum of the optical signals. Meanwhile, since the light quantities sensed in the blocks A2-B1 and A2B5 are zero, only the light quantities of the block A2-B2 caused by the noise are actually excluded from the sum.

Figure 12:
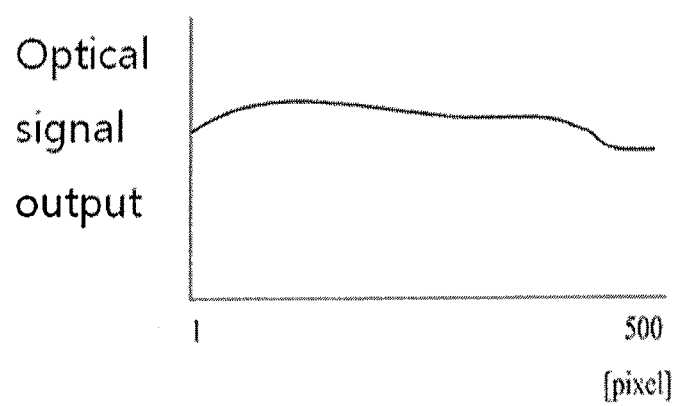
FIG. 12 is a graph illustrating the optical signal output after sensing an optical signal in FIG. 9.

As shown in FIG. 12, it can be seen that a light quantity value is at the same level on a per pixel basis, considering the sum of the optical signals of the pixels in the same column after selection of the blocks activated in each column. It can be seen that light quantity detection is stably output at a certain level with respect to the entire pixels. This means that influence due to noise is excluded.

In FIG. 9, the block is selected in such a way that the block having maximum output optical signals is selected from the same column so as to set only the selected block as the ROI. This serves as a kind of filtering process. Through such a filtering process, data is not transmitted to the entirety of the plural blocks, but the optical signals received from the particular block, which is selected, to the touch control unit are transmitted. Consequently, a data transmission amount may be reduced at a level similar to the line sensor which has the plural light receiving pixels arranged in line.

As shown in FIG. 9, in the case of the light receiving regions having, for example, 5×5 blocks (A1~A5×B1~B5), the block rows B3 and B4 are selected with respect to the block columns A1 and A2, whereas the block rows B2 and B3 are selected with respect to the block columns A3, A4, and A5. In the illustrated example, two blocks are selected with respect to each column, but the present embodiment is not limited thereto. Accordingly, one block or three or more blocks may be selected with respect to the column. Here, in the detection of the optical signal, the selected block is referred to as an active state, whereas the non-selected block is referred to as an inactive state.

Each of the blocks is included with the pixels which are respectively arranged in the plural columns. In the illustrated example, the block is included with five pixels, but the present embodiment is not limited thereto. That is, the plural pixels may be included in the same block. In this case, the pixels are arranged in the same row.

Also, the present embodiment allows the optical signal of each pixel activated in the particular block(s) of the same column to be summed so that one signal summed is output and transmitted to the outside, together with the selection of the particular block(s). Consequently, a data amount of the present embodiment may be the same level as the case of constructing the light receiving region in which the pixels are arranged in one row.

Figure 13:
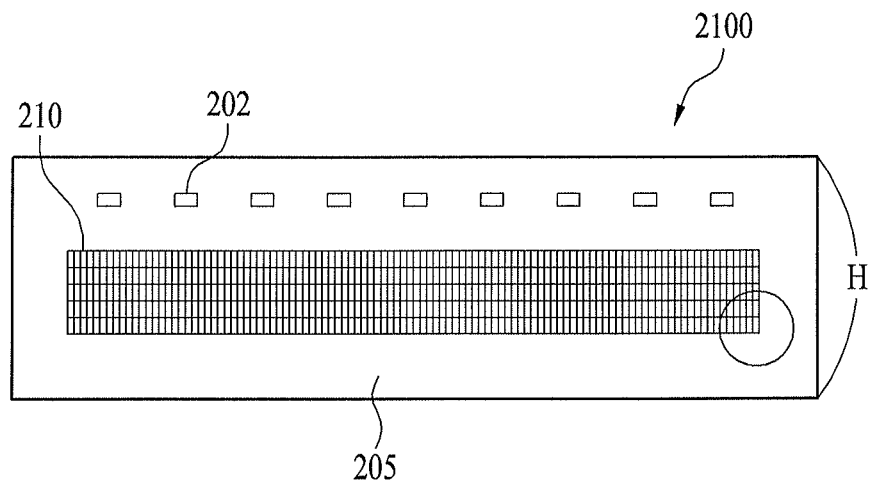
FIG. 13 is a top view illustrating a sensor block included in the infrared sensor module according to the embodiment of the present invention.
Figure 14:
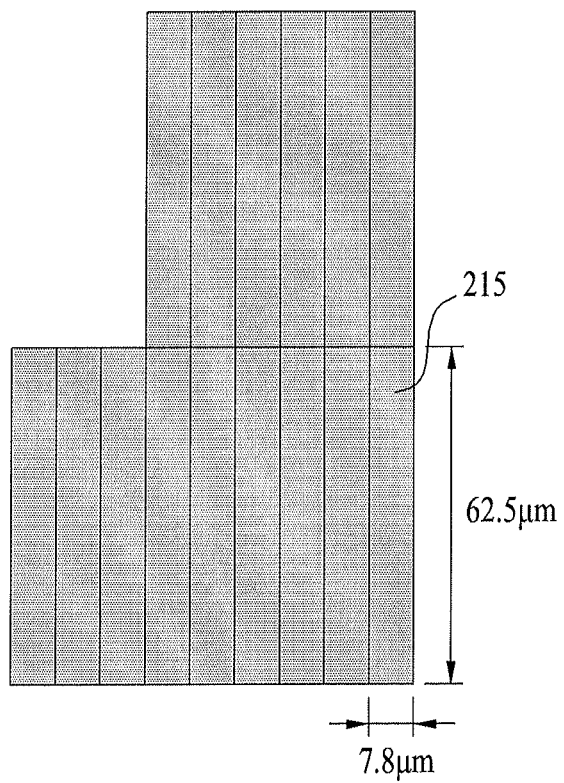
FIG. 14 is an enlarged view illustrating a part of a right lower corner in a light receiving region of FIG. 13.

FIG. 13 is a top view illustrating the sensor block included in the infrared sensor module according to the embodiment of the present invention. FIG. 14 is an enlarged view illustrating a part of a right lower corner in the light receiving region of FIG. 13.

As shown in FIG. 13, the sensor block 2100 includes a base plate 205, a light receiving region 210 arranged with light receiving pixels 215 composed of 2~10 rows and 100~9000 columns at a lower end of the base plate 205, and terminals 202 connected with a Flexible Printed Circuit (FPC; not shown) and the like in order to transmit the optical signals sensed in the light receiving region to the touch control unit. The light receiving region 210 and each of the terminals 202 are electrically connected at an internal portion of the base plate 205.

In one example, each of the light receiving pixels 215 is about 7.8 μm wide and about 62.5 μm long, as shown in FIG. 14. When the light receiving pixels 215 are arranged in five rows as illustrated in the drawing, the light receiving pixels 215 are about 312.5 μm in total height. Accordingly, the light receiving pixels 215 may be sufficiently placed within an entire height "H" of the base plate 205.

Here, the entire height "H" of the base plate 205 is not more than about 1 mm. Thus, when the base plate 205 is located to be erected on the surface of the display panel, the infrared sensor module is not largely change in thickness, compared to the line sensor having the light receiving pixels arranged in one row. This is because the light receiving pixels 215 according to an increased row in the light receiving region are arranged in a remaining space of the base plate 205.

Accordingly, the infrared sensor module of the present invention allows the light receiving pixels of several hundred columns to be arranged in multiple rows in the light receiving region of the sensor block in the infrared sensor module so that no optical signals depart from the light receiving region of the infrared sensor module. Thus, the optical signals may be converged on the light receiving pixels 215 of the light receiving region without overall change of the height or volume of the infrared sensor module. As a result, erroneous operation of the touch is prevented, thereby enabling improvement of touch sensitivity.

Meanwhile, horizontal and vertical proportions of each light receiving pixel 215 may be changed. However, the light receiving pixels 215 are arranged in such a manner as to relatively set ten rows and increase the number of columns in the light receiving region 210. Thus, when vertical length of each light receiving pixel 215 is larger than the horizontal length thereof, the light receiving pixel 215 may be advantageously arranged within the base plate 205.

In particular, although the number of rows is increased in the light receiving region, the increased rows may be arranged using a remaining space in the sensor block. Therefore, an entire thickness of the infrared sensor module is not increased, thereby enabling obtainment of optical touch detection in a state in which a slim display device is maintained.

Meanwhile, when s number of light receiving pixels 215 are arranged in one row of the light receiving region, effective sensing pixels are a portion except for parts of initial and final pixels. In this case, the effective sensing pixels may be respectively matched with angles of 0° to 90° with respect to two sides of the display panel adjacent to the sensor block 2100.

Hereinafter, the display device using the above-mentioned infrared sensor module will be described.

Figure 15:
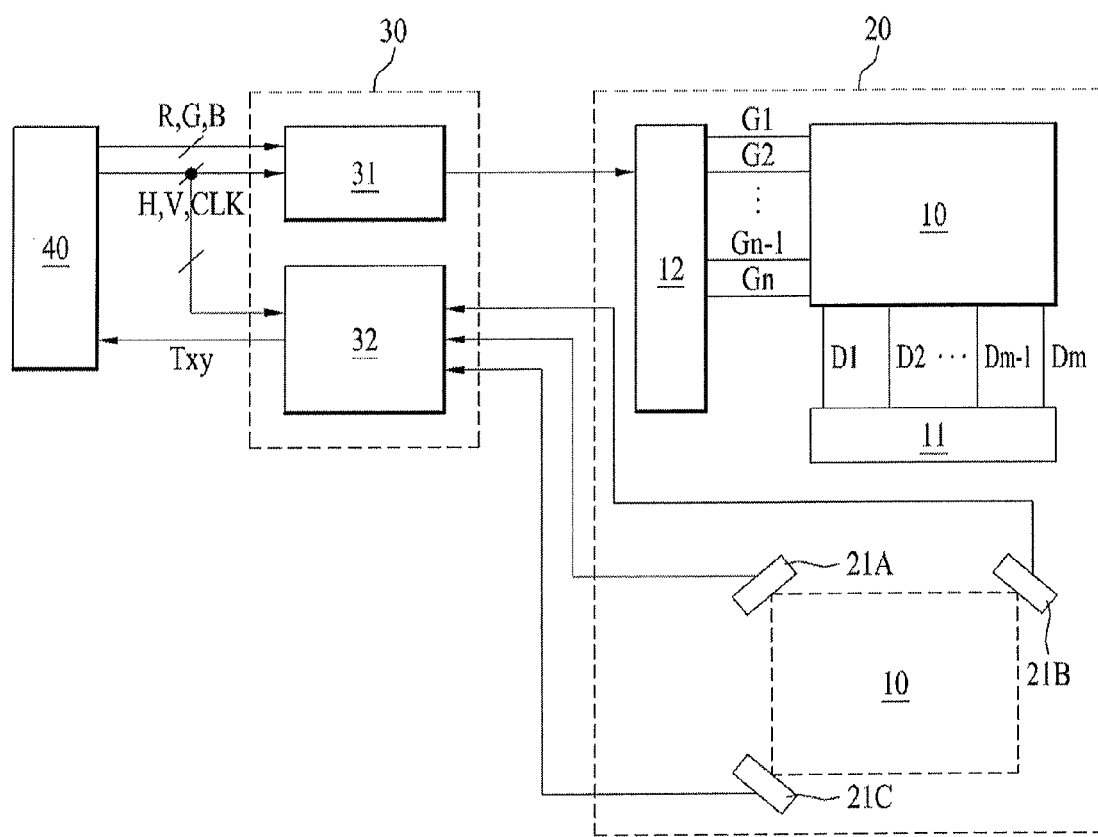
FIG. 15 is a block diagram illustrating a display device according to the embodiment of the present invention.

FIG. 15 is a block diagram illustrating the display device according to the embodiment of the present invention.

As shown in FIG. 15, the display device according to the embodiment of the present invention includes a display module 20 in which the infrared sensor modules 21A to 21C are respectively located at the corners of the display panel 10 for displaying an image, a control board 30 to control the display module 20 and execute an algorithm for perceiving a touch position, and a system 40 for supplying the control board 30 with timing signals and digital video data RGB to be displayed on the display panel 10.

The display module 20 includes the display panel 10 for displaying an image, a source driver 11 for supplying data voltage to data lines D1 to Dm of the display panel 10, a gate driver 12 for supplying scan pulses to gate lines G1 to Gn of the display panel 10, and the infrared sensor modules 21A to 21C located at the corners of the display panel 10, respectively.

Also, although not shown, the display module 20 includes the case top 26 formed of a frame shape so as to encase edges and sides of the display panel 10 and the infrared sensor modules 21A to 21C located at respective upper portions of the corners of the display panel 10, and the casing structure, which is a bottom cover (not shown), formed so as to engage with the case top 26 and store the display panel 10 from a lower part.

In the illustrated drawing, although the infrared sensor modules are located at three corners, but the present embodiment is not limited thereto. Accordingly, the infrared sensor modules may be formed to be located at two or four corners.

The display panel 10 may be a flat display panel, and generally has a quadrangle shape. In addition, the display panel 10 includes both substrates and an intermediate layer formed therebetween, and is different in kind depending on a component and function of the intermediate layer. One example of the display panel 10 may be a liquid crystal display panel, but the present embodiment is not limited thereto. That is, the display panel 10 may also be any one of an electrophoretic display panel, an organic light emitting display panel, an electric field emission display panel, a quantum dot display panel, and a plasma display panel.

When the display panel 10 is, for example, the liquid crystal display panel, the display panel 10 includes a Thin Film Transistor (hereinafter, referred to as "TFT") substrate and a color filter substrate. A liquid crystal layer is formed between the TFT substrate and the color filter substrate. The TFT substrate is formed so that the gate lines G1 to Gn and the data lines D1 to Dm on a lower glass substrate are intersected with each other at right angles. Liquid crystal cells Clc are respectively arranged in cell regions defined by the data lines D1 to Dm and the gate lines G1 to Gn in a matrix form. TFTs formed at intersectional portions of the respective data lines D1 to Dm and the respective gate lines G1 to Gn respond to the scan pulses from the gate lines G1 to Gn so as to transfer the data voltage supplied via the data lines D1 to Dm to pixel electrodes of the liquid crystal cells Clc, respectively. To achieve this, gate electrodes of TFTs are respectively connected to the gate lines G1 to Gn, whereas source electrodes thereof are respectively connected to the data lines D1 to Dm. Drain electrodes of the TFTs are connected to the pixel electrodes of the liquid crystal cells Clc, respectively. Common electrodes which face the pixel electrodes are supplied with common voltage Vcom. The color filter substrate includes a color filter and a black matrix formed on an upper glass substrate.

Each of the common electrodes is formed on the upper glass substrate in a vertical electric field driving manner such as a Twisted Nematic (TN) mode and a Vertical Alignment (VA) mode while being formed on the lower glass substrate in a horizontal electric field driving manner such as an In Plane Switching (IPS) mode and a Fringe Field Switching (FFS) mode, together with each pixel electrode.

The source driver 11 includes a plurality of data integrated circuits. The source driver 11 converts the digital video data RGB input from the control board 30 into positive or negative analog gamma compensation voltage under control of the control board 30 so as to supply the analog gamma compensation voltage to the data lines D1 to Dm as analog data voltage.

The gate driver 12 includes a plurality of gate integrated circuits so as to sequentially supply the scan pulses to the gate lines G1 to Gn under control of control board 30.

The data integrated circuits of the source driver 11 and the gate integrated circuits of the gate driver 12 may be formed on the lower glass substrate in a manner such as Chip On Glass (COG) or Tape Automated Bonding (TAB) using a Tape Carrier Package (TCP). The gate integrated circuits of the gate driver 12 may be directly formed on the lower glass simultaneously with the TFTs of the display panel 10 and in the same process as the TFT process.

The control board 30 is connected to the source driver 11 and the gate driver 12 through the Flexible Printed Circuit (FPC) and a connector. The control board 30 includes a timing controller 31 and a touch control unit 32.

The timing controller 31 generates a gate control signal for controlling operation timing of the gate driver 12 using vertical/horizontal synchronous signals V and H and a clock CLK, and a data control signal for controlling operation timing of the source driver 11. In addition, the timing controller 31 supplies the digital video data RGB input from the system 40 to the source driver 11.

A touch control circuit of the touch control unit 32 stores a reference value compared with each pixel of the sensor blocks included in the infrared sensor modules 21A to 21C, and compare the reference value with the infrared optical signals received to the infrared sensor modules, thereby performing the detection of the touch position.

The touch control unit 32 supplies the system 40 with touch position coordinate information Txy. Since the touch control unit 32 shares the timing signals such as the vertical/horizontal synchronous signals V and H, the clock CLK, and the like with the timing controller 31, the touch control unit 32 is synchronized with the timing controller 31 and is operated.

Furthermore, the touch control unit 32 applies an auto horizontal calibration algorithm which automatically sets effective view angles of the infrared sensor modules 21A to 21C, together with an auto vertical calibration according to the selection of the block described above, prior to the abovementioned detection of the touch position. To achieve this, the touch control unit 32 further includes an auto angle setting portion (not shown) in addition to a touch position calculating portion.

Here, the system 40 includes a memory equipped with an application program, a central processing unit for executing the application program, and a graphic processing circuit which composes an image to be displayed on the display panel 10 and a touch image so as to process a signal interpolating process of the composed data, a resolution conversion and the like. The system 40 receives the touch position information Txy from the touch control unit 32 and then executes the application program associated with the touch position information Txy. For example, when an icon for a particular program is in the coordinate of the touch position, the system 40 loads the program from the memory so that the program is executed. In addition, the system 40 composes the image to be displayed on the display panel 10 and the touch image so as to generate the digital video data RGB. The system 40 may be implemented by a Personal Computer (PC), and may exchange data with the touch control unit 32 through an Universal Serial Bus (BUS) interface.

Figure 16:
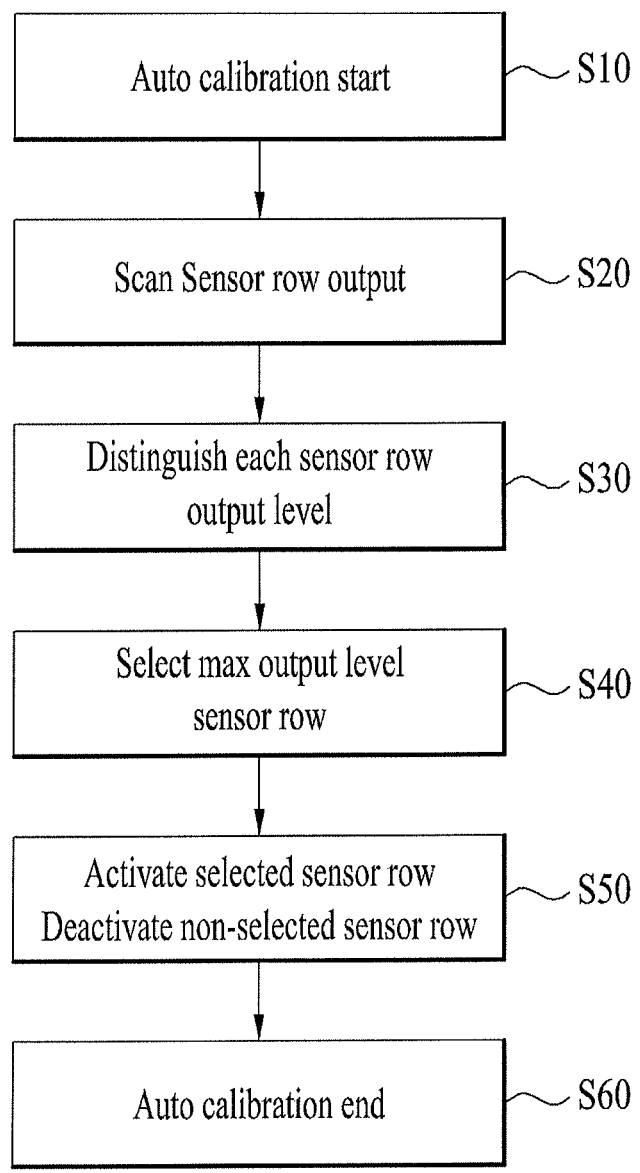
FIG. 16 is flowchart illustrating an auto calibration method of the infrared sensor module according to the embodiment of the present invention.

FIG. 16 is flowchart illustrating the auto calibration method of the infrared sensor module according to the embodiment of the present invention.

As shown in FIG. 16, the auto calibration method of the infrared sensor module according to the embodiment of the present invention is as follows.

As shown in FIG. 16, the auto calibration method of the infrared sensor module according to the present embodiment is useful when the optical signal departs from a predetermined light receiving region depending on the deviation of the infrared sensor module. The auto calibration method described below may be performed every drive of the display device (for example, every recognition of a device in the PC and the like), every generation of a particular event, or every intended execution of a user.

The auto calibration method seeks the light receiving region in the sensor block to which the optical signals are actually received, without performing a physical calibration by a user. If the auto calibration is performed every generation of the particular event or every intended execution of a user, the auto calibration method stores a region which is set as the ROI in the previous light receiving region so as to skip the auto calibration during next reset of a drive power source in the display device and use the stored region, prior to selection of a user.

Furthermore, when the auto calibration is performed every drive of the display device, the selection of the particular block in the light receiving region may be automatically performed every drive of products, thereby automatically processing vertical alignment of the particular block in the sensor block. Consequently, erroneous operation of the touch by the deviation of the infrared sensor module which occurs due to elapse of time or impact of products may be prevented.

As shown in FIG. 16, after turning on the infrared sensor module which includes a sensor block with a light receiving region and is arranged to be perpendicular to a surface of a display panel, wherein the light receiving region is divided into m×n blocks (where, each of m and n is a natural number of two or more) arranged in m rows by n columns, the auto calibration starts (S10).

Subsequently, the optical signals per each of the m rows are scanned (S20).

Subsequently, the optical signals of each row are compared (S30).

Subsequently, the block, which has the maximum output optical signals of the blocks of each n column, is selected (S40).

Subsequently, the selected block is activated and the non-selected block is deactivated so as to assort the blocks (S50).

Subsequently, the activated block(S) is set as a Region of Interest (ROI) and the auto calibration ends (S60).

In this case, the ROI is selected is according to deviation of infrared sensor module and it is possible to correctly sense touch by the above auto calibration even there is deviation.

Figure 17:
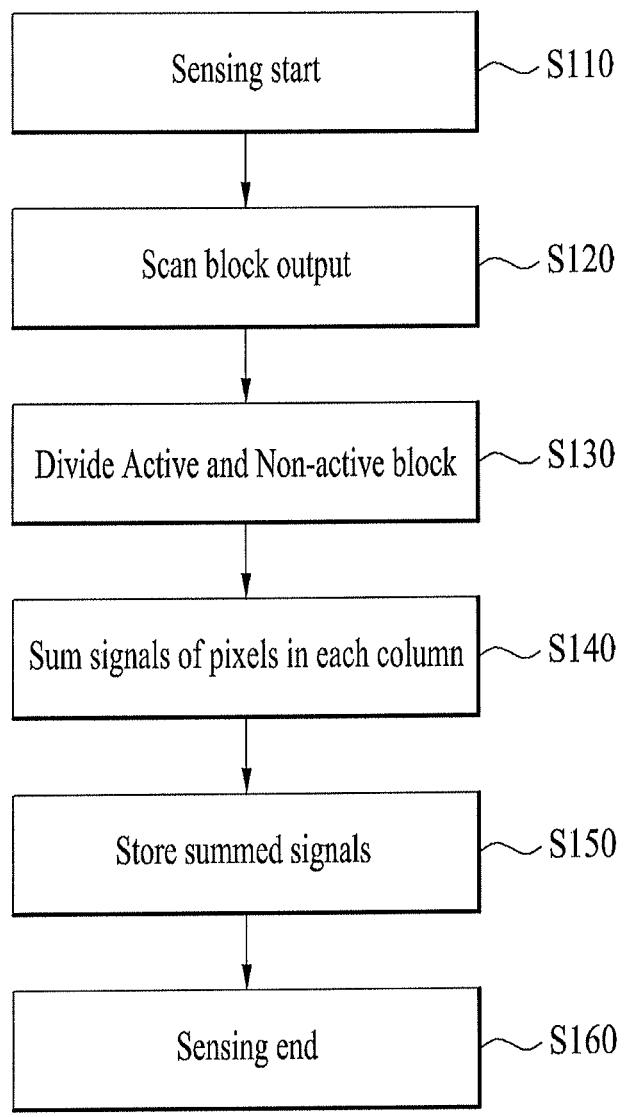
FIG. 17 is flowchart illustrating a touch sensing method to which the auto calibration method according to the embodiment of the present invention is applied.

FIG. 17 is flowchart illustrating the touch sensing method to which the auto calibration method according to the embodiment of the present invention is applied.

A configuration using the touch sensing method of the infrared sensor module according to the present embodiment has the configuration of the sensor block illustrated in FIGS. 8 to 10 and the control board 30 illustrated in FIG. 15.

First, after turning on the infrared sensor module in which the light receiving region 210 in the sensor block 2100 is divided into m x n blocks (where, each of m and n is a natural number of two or more) arranged in m rows by n columns, the touch sensing starts (S110). Here, the plural pixels are respectively arranged in the plural columns within each of the blocks, and each of the pixels includes a light receiving element capable of sensing the light quantity.

Subsequently, the optical signals of each block are scanned (S120). Meanwhile, the step of scanning the optical signals of each block may be performed every drive of the display device including the infrared sensor module according to the auto calibration method described in FIG. 16, or be performed by selection of a user. In the case of the latter, the ROI which is set until the selection of a user is stored so as to be used for measurement of the optical signals.

Also, the step of scanning the optical signals of each block may be performed every generation of the particular event. In this case, the ROI which is set until the generation of the particular event is stored so as to be used for measurement of the optical signals.

In addition, the step of selecting the block having the maximum output optical signals with respect to the blocks of each column may select one or more blocks from each column. In this case, the blocks may be set as one unit.

Subsequently, the particular block on which the optical signals are concentrated is selected after comparing the optical signals of the scanned blocks so as to assort the activated block and the deactivated block (S130). In this case, at least one block is selected from each of the columns. When the plural blocks are selected from each of the columns, adjacent blocks are selected to be activated, thereby enabling exclusion of noise. Activation of the block and deactivation of the block may be performed according to the auto calibration method described in FIG. 16, or be set as the selected ROI in advance.

In this case, the block may be selected from each column in the same row, or also be selected from each column in another row. In the case of the former, the infrared sensor module is arranged almost horizontally, and thus it is assumed that the light quantities are concentrated in a horizontal state.

Subsequently, the light quantities of the pixels on a per column basis are summed with respect to the activated block(S) so as to transfer the optical signal output to the touch control unit 32 provided outside the sensor block (S140). The sum of the light quantities is performed with respect to the pixels arranged per column.

Here, light quantity values summed on a per block basis and on a per column basis, which are activated, may be stored in the particular memory provided at the touch control unit (S150). In this case, the auto calibration may be skipped during next reset of a power source so as to use result values which are previously stored.

Subsequently, the activated block(s) is set as the ROI and the touch sensing may end (S160).

Here, the light quantities (optical signals) of the pixels on a per column basis with respect to the activated block(s) are received to the touch control unit, and thus it may be detected whether the touch is perceived or not depending on the level of the light quantities. That is, when the light quantities of the pixels in the particular column are smaller than a certain level, compared to an initial value (in the case of turning on the light emitting portion), the touch may be detected.

Meanwhile, the above-mentioned auto calibration method selects the block(s) having the maximum output optical signals in a corresponding position so as to sense the optical signals of the light receiving pixels in a corresponding block(s), without physically calibrating the extent of the deviation of the infrared sensor module. Consequently, the data transmission amount is not increased, and the effective light sensing output may be obtained. As a result, touch sensitivity may be improved. In particular, when the infrared sensor module deviates in the vertical direction, the problem in that the optical signals fully depart from the light receiving region may be resolved through the above-mentioned auto calibration method.

In addition, the above-mentioned auto calibration method sets an optical signal generation region by simple selection of the particular block in the light receiving region until a product launch. Consequently, the physical calibration or sophisticated work of a worker is not required, thereby enabling simplification of manufacturing processes.

Furthermore, the ROI is selected from one or more particular blocks with respect to each column by application of the auto calibration method, and then the light quantities of the pixels on a per column basis with respect to only the selected blocks are summed. As a result, a calculation amount may be reduced during the detection of the light quantities (optical signals) for the touch sensing.

As is apparent from the above description, the infrared sensor module, the touch sensing method thereof, and the auto calibration method applied to the same according to the present invention has the following effects.

First, the infrared sensor module allows the light receiving pixels of several hundred columns to be arranged in multiple rows in the light receiving region of the sensor block so that no optical signals depart from the light receiving region of the infrared sensor module. Thus, the optical signals may be converged on the light receiving pixels of the light receiving region without overall change of the height or volume of the infrared sensor module. As a result, erroneous operation of the touch is prevented, thereby enabling improvement of touch sensitivity.

Second, although the number of rows is increased in the light receiving region, the increased rows may be arranged using the remaining space in the sensor block. Therefore, the entire thickness of the infrared sensor module is not increased, thereby enabling obtainment of optical touch detection in the state in which the slim display device is maintained.

Third, each rows of the light receiving region in the sensor block is divided into blocks so that the predetermined number of pixels is included in each of the blocks, and only the particular block on which the optical signals are concentrated is selected so as to process data. Consequently, influence due to noise which generates from the other region may be excluded.

Fourth, only the particular block on which the optical signals are concentrated is selected so as to process data, thereby reducing a data processing amount. As a result, speed deterioration of the touch detection may be prevented.

Fifth, the selection of the particular block in the light receiving region may be automatically performed every drive of products, or be performed by selection of a user or by the particular event, thereby automatically processing vertical alignment of the particular block in the sensor block. Consequently, erroneous operation of the touch by the deviation of the infrared sensor module which occurs due to elapse of time or impact of products may be prevented.

Sixth, the ROI is selected from one or more particular blocks with respect to each column by application of the auto calibration method, and then the light quantities of the pixels on a per column basis with respect to only the selected blocks are summed. As a result, a calculation amount may be reduced during the detection of the light quantities (optical signals) for the touch sensing.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An infrared sensor module including a sensor block with a light receiving region, wherein:
   the sensor block is perpendicular to a surface of a display panel;
   the light receiving region is divided into 'm×n' blocks (where, each of 'm' and 'n' is a natural number of two or more) arranged in 'm' rows by 'n' columns, and each of the blocks includes a plurality of light receiving pixels arranged in the same row; and
   optical signals of a particular block, to which light is received, are transmitted to a touch control unit, wherein the particular block is selected from at least one of the 'm' rows with respect to each of the 'n' columns,
   wherein the infrared sensor module is formed on an inner surface of a case top encasing the display panel and the light receiving region has a height under a height of the inner surface of the case top and
   wherein a block which is selected during an auto-calibration is activated as a Region of Interest (ROI) during detection of a touch.

2. The infrared sensor module according to claim 1, wherein each of the blocks has about 10~500 light receiving pixels.

3. The infrared sensor module according to claim 1, wherein each of the light receiving pixels has a vertical length longer than a horizontal length.

4. The infrared sensor module according to claim 1, wherein the particular block is selected through light receiving distribution of the optical signals received.

5. The infrared sensor module according to claim 4, wherein the particular block is selected after filtering and excluding noise of the received optical signals.

6. The infrared sensor module according to claim 1, wherein each of the 'm' and 'n' is a number of 2 to 10.

7. A touch sensing method of an infrared sensor module comprising:
 turning on the infrared sensor module, which includes a sensor block with a light receiving region, and is perpendicular to a surface of a display panel, the light receiving region being divided into 'm×n' blocks (where, each of 'm' and 'n' is a natural number of two or more) arranged in 'm' rows by 'n' columns, each of the blocks having a plurality of light receiving pixels arranged in a row direction, wherein the infrared sensor module is formed on an inner surface of a case top encasing the display panel and the light receiving region has a height under a height of the inner surface of the case top;
 scanning optical signals of each block;
 selecting the block having maximum output optical signals with respect to the blocks of each column;
 summing the optical signals of the light receiving pixels of the block selected from the column; and
 activating the block only selected during the selection step so that the selected block is set as a Region of Interest (ROI) during detection of a touch.

8. The touch sensing method of the infrared sensor module according to claim 7, the scanning optical signals of each block is performed every drive of a display device including the infrared sensor module.

9. The touch sensing method of the infrared sensor module according to claim 7, wherein the scanning optical signals of each block is performed by selection of a user.

10. The touch sensing method of the infrared sensor module according to claim 9, wherein the region of interest which is set until the selection of a user is stored so as to be used for measurement of the optical signals.

11. The touch sensing method of the infrared sensor module according to claim 7, wherein the scanning optical signals of each block is performed every generation of a particular event.

12. The touch sensing method of the infrared sensor module according to claim 11, wherein the region of interest which is until the generation of the particular event is stored so as to be used for measurement of the optical signals.

13. An auto calibration method of an infrared sensor module comprising:
 turning on the infrared sensor module, which includes a sensor block with a light receiving region, and is perpendicular to a surface of a display panel, the light receiving region being divided into 'm×n' blocks (where, each of 'm' and 'n' is a natural number of two or more) arranged in 'm' rows by 'n' columns, each of the blocks having a plurality of light receiving pixels arranged in a row direction, wherein the infrared sensor module is formed on an inner surface of a case top and the light receiving region has a height under a height of the inner surface of the case top encasing the display panel;
 scanning optical signals per each of the m rows;
 comparing the optical signals of each row;
 selecting the block having maximum output optical signals with respect to the blocks of each n column; and
 activating the block which is selected and deactivating the block which is not selected so as to assort the blocks,
 wherein the block which is selected is only activated as a Region of Interest (ROI) during detection of a touch.

14. The auto calibration method of the infrared sensor module according to claim 13, wherein the scanning optical signals per each of the 'm' rows is performed every drive of a display device including the infrared sensor module.

15. The auto calibration method of the infrared sensor module according to claim 13, wherein the scanning optical signals per each of the m rows is performed by selection of a user.

16. The auto calibration method of the infrared sensor module according to claim 15, wherein the region of interest which is set until the selection of a user is stored so as to be used for measurement of the optical signals.

17. The auto calibration method of the infrared sensor module according to claim 13, wherein the scanning optical signals per each of the 'm' rows every generation of a particular event.

18. The auto calibration method of the infrared sensor module according to claim 17, wherein the region of interest which is until the generation of the particular event is stored so as to be used for measurement of the optical signals.

19. The auto calibration method of the infrared sensor module according to claim 13, wherein the selecting the block having maximum output optical signals with respect to the blocks of each 'n' column selects one or more blocks from each column.

\* \* \* \* \*